US008842965B1

(12) United States Patent
Song et al.

(10) Patent No.: US 8,842,965 B1
(45) Date of Patent: Sep. 23, 2014

(54) LARGE SCALE VIDEO EVENT CLASSIFICATION

(75) Inventors: Yang Song, San Jose, CA (US); Ming Zhao, Seattle, WA (US); Bingbing Ni, Singapore (SG)

(73) Assignee: Google Inc., Mountain View, CA (US)

( * ) Notice: Subject to any disclaimer, the term of this patent is extended or adjusted under 35 U.S.C. 154(b) by 5 days.

(21) Appl. No.: 13/287,974

(22) Filed: Nov. 2, 2011

(51) Int. Cl.
*H04N 5/765* (2006.01)

(52) U.S. Cl.
USPC .......................................... 386/230; 386/353

(58) Field of Classification Search
None
See application file for complete search history.

(56) References Cited

U.S. PATENT DOCUMENTS

| | | | |
|---|---|---|---|
| 6,289,304 B1* | 9/2001 | Grefenstette | 704/9 |
| 2002/0029304 A1* | 3/2002 | Reynar et al. | 709/332 |
| 2004/0158452 A1* | 8/2004 | Polanyi et al. | 704/4 |
| 2008/0168134 A1* | 7/2008 | Goodman et al. | 709/204 |
| 2009/0292685 A1* | 11/2009 | Liu et al. | 707/5 |
| 2009/0326947 A1* | 12/2009 | Arnold et al. | 704/257 |
| 2010/0235313 A1* | 9/2010 | Rea et al. | 706/52 |
| 2011/0142335 A1* | 6/2011 | Ghanem et al. | 382/165 |
| 2012/0197735 A1* | 8/2012 | Dey | 705/14.66 |
| 2012/0323948 A1* | 12/2012 | Li et al. | 707/765 |

OTHER PUBLICATIONS

Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.
Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.
Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.
Lu, Jian, "Video fingerprinting for copy identification: from research to industry applications," Proceedings of SPIE—Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.
Ni et al., YouTubeEvent: on Large-Scale Video Event Classification, Third International Workshop on Video Event Categorization, Tagging and Retrieval for Real-World Applications, IEEE, 2011, 8 pages.

\* cited by examiner

*Primary Examiner* — William C Vaughn, Jr.
*Assistant Examiner* — Eileen Adams
(74) *Attorney, Agent, or Firm* — Amin, Turocy & Watson, LLP

(57) ABSTRACT

Systems and methods are provided herein relating to video classification. A text mining component is disclosed that automatically generates a plurality of video event categories. Part-of-Speech (POS) analysis can be applied to video titles and descriptions, further using a lexical hierarchy to filter potential classifications. Classification performance can be further improved by extracting content-based features from a video sample. Using the content based features a set of classifier scores can be generated. A hyper classifier can use both the classifier scores and the content-based features of the video to classify the video sample.

20 Claims, 9 Drawing Sheets

LARGE SCALE VIDEO EVENT CLASSIFICATION

TECHNICAL FIELD

This application relates to video classification, and, more particularly, to general event classification for submitted videos.

BACKGROUND

Video event classification has great potential in applications such as content-based video retrieval, video surveillance, and human-computer interaction. Most previous works on video event or human action recognition are associated with a few categories usually defined for a specific application. For example, in the context of retail store security surveillance, a type of an event classification category could be when a human picks up an item. Most such videos are collected in controlled environments with known illumination and background settings. By being collected in a controlled environment, it may be easier to identify actions since background noise can be more easily filtered.

In sharp contrast with controlled environments, there is an increasing demand for general event classification for submitted videos. When classifying submitted videos, large variations exist in illumination, camera motion, people's posture, clothing, etc. In addition to variations in video, the number of categories involved in general event classification is orders of magnitude higher than the number of categories in most existing event recognition systems. Manually defining these labels becomes extremely labor intensive. Therefore, automatic discovery of a collection of event categories would be useful.

One major difficulty in general video event classification is the lack of labeled training data. Classification systems usually use small video databases. This can make generalization of the classification system to submitted videos an even harder task. Although there are some attempts to develop web-based interactive tools for video annotation, those tools are still limited in scope. The growth of shared videos on services such as YouTube can help shed light on solving these issues. The large number of videos as well as the rich diversity of video content provides potential sources for constructing a large-scale video event database. Additionally, user entered video titles and descriptions may contain useful information related to classification. However, the task of categorizing such videos is highly challenging due to the number of possible categories and large intra-category variations. Therefore, there exists a need to both define proper event category labels and to obtain and use training samples for the defined category labels to measure classification performance.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular implementation of the specification, or any scope of the claims. Its sole purpose is to present some concepts of the specification in a simplified form as a prelude to the more detailed description that is presented in this disclosure.

Systems and methods disclosed herein relate to video classification and more particularly to applying part-of-speech (POS) analysis to video titles and descriptions to establish classification categories. A text mining component can text mine at least one of a description or a title of a video sample for at least one word combination wherein the word combination is at least one of a noun-verb combination or a verb-noun combination. A data storage component can store in the memory the at least one word combination as a category label among a set of category labels. A category filter component can filter the set of category labels stored in the memory based upon a WordNet hierarchy.

DETAILED DESCRIPTION

Figure 1:
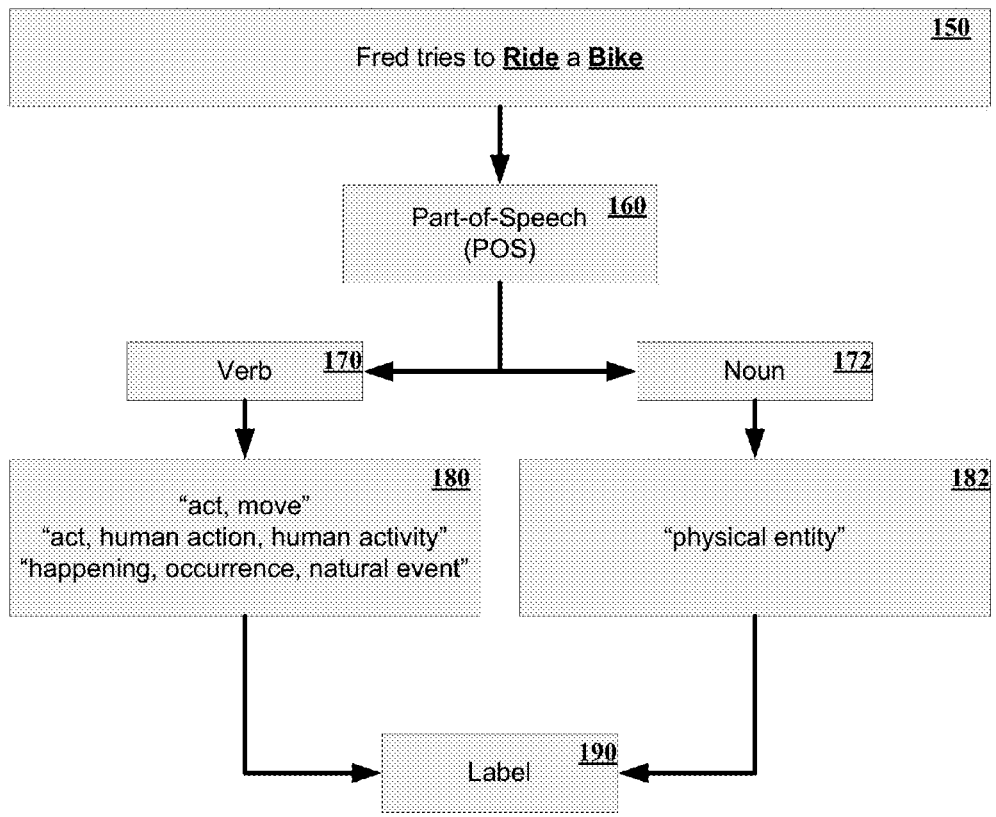
FIG. 1 illustrates a graphical diagram example of category filtering in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Video classification in general involves establishing event labels for video samples and classifying the video samples based on those event labels. One challenge in video classification is how to automatically obtain relevant event labels from large yet noisy video metadata. When users upload videos to YouTube, for example, they often annotate the videos with titles and descriptions, which can be stored as metadata associated with the video. However, these annotations may not always be a strong corollary to actual video content as the annotations are dependent upon unpredictable users.

However, even though these annotations may not always be a strong corollary, they still provide valuable information towards the actual content of the video.

One challenge associated with using user annotations to categorize video is determining valid language structures for an event label. Another challenge faced is that as the number of event label categories could be incredibly large. It may be desirable to develop a method to prune event label categories, removing irrelevant categories while retaining relevant ones. In this disclosure, a text processing pipeline can be used to address these challenges. Specifically, in addressing the first challenge, systems and methods disclosed herein utilize Part-of-Speech (POS) analysis to mine candidate videos for event labels. In addressing the second challenge, a WordNet hierarchy can then be used to filter the event label categories.

In one implementation, systems and methods herein provide for using a large selection of existing video to develop trained classifiers used to categorize videos. Through the use of this large database of videos, systems and methods herein provide for addressing the large intra-category variations desired to achieve satisfactory classification performances. To improve classification performances, scores from a set of event classifiers can be utilized as a type of high-level feature. Hyper classifiers can then be trained based on the combination of the video content based features and this high level feature. The high level features can convey knowledge across classes, and can fuse the knowledge with video content-based features to bring more discriminative capabilities to the video classification systems and methods.

Turning now to FIG. 1, there is illustrated 1 a graphical diagram example of category filtering in accordance with implementations of this disclosure. A video hosting site can contains hundreds of millions of videos uploaded by users. Each video can have a title and, for many, a text description. Though potentially noisy, most of these titles and descriptions provide relevant information about the video content.

In one implementation, systems and methods herein can use a natural language processing tool to apply Part-of-Speech (POS) tagging and identify instances of nouns and verbs. To obtain reliable common patterns, particles and articles can be filtered out. After identifying nouns and verbs, systems and methods herein can search for patterns that could be potential video event labels. Two types of noun and verb combinations, i.e., NOUN+VERB or VERB+NOUN, can be identified. This procedure can automatically discover instances of human actions when NOUN is of a human subject, for example.

The resulting VERB and NOUN combinations may be generally noisy and many of them may not correspond to any valid video event. Therefore, in one implementation, a lexical database hierarchy can be applied to constrain the text search space, e.g., a WordNet® hierarchy. WordNet® is a large lexical database of English words, which are grouped into sets of cognitive synonyms (synsets). Synsets are interlinked by means of conceptual-semantic and lexical relations. VERB synsets and NOUN synsets are organized in WordNet® using a hierarchical tree structure.

In one implementation, systems and methods herein can constrain the NOUN to be only within the hierarchy of physical entity, and the VERB to be in the hierarchies of "act, move;" "happening, occurrence, natural event;" or "act, human action, human activity." It can be appreciated that the last two hierarchies are in the WordNet NOUN hierarchy; however, because their POS tag could be VERB, they can be qualified for a VERB in the systems and methods disclosed herein. By applying these constraints, a large portion of combinations, which may be undesirable video event labels, can be filtered out.

For example, referring to FIG. 1, at 150 the title "Fred tries to Ride a Bike" is identified. At 160, POS tagging can identify the Verb 170 as "Ride" and the Noun 172 as "Bike." At 180, certain implementations of systems and methods disclosed herein can determine whether the verb "Ride" is within one of the enumerated hierarchies. At 182, it can be determined whether the noun "Bike" is a physical entity. In the event both the Verb 170 and Noun 172 meet the filter requirements 180 and 182 respectively, a label 190 can be created. It can be appreciated that filter requirements 180 and 182 are adaptable and can be set based upon other hierarchies, including other WordNet® hierarchies, not shown in FIG. 1.

Figure 2:
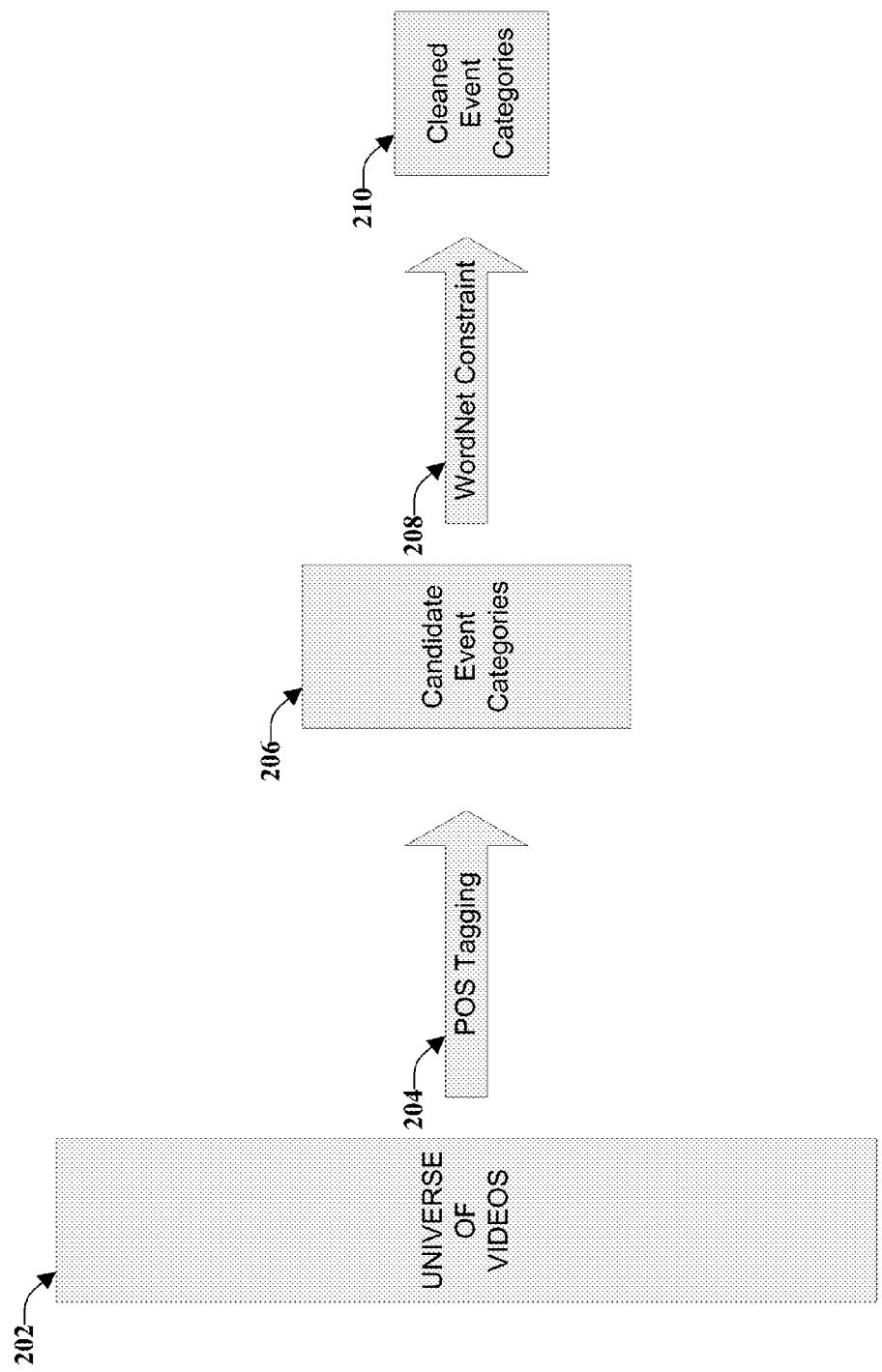
FIG. 2 illustrates a graphical example diagram of the reduction of candidate event categories during a text mining process in accordance with implementations of this disclosure.

Turning now to FIG. 2, there is illustrated a graphical example diagram of the reduction of candidate event categories during a text mining process in accordance with implementations of this disclosure. A universe of videos 202 can be identified. At 204, POS tagging can occur, the result of which can be the creation of a set of candidate event categories 206. The set of candidate event categories 206 is generally smaller than the universe of videos 202. At 208, lexical constraints, such as those discussed above using WordNet® heirarchies, can be utilized to further reduce the number of categories to a set of cleaned event categories 210. For example, the set of candidate event categories 206 may contain 246,755 video event categories. The set of cleaned event categories 210 may contain 29,163 video event categories.

Figure 3:
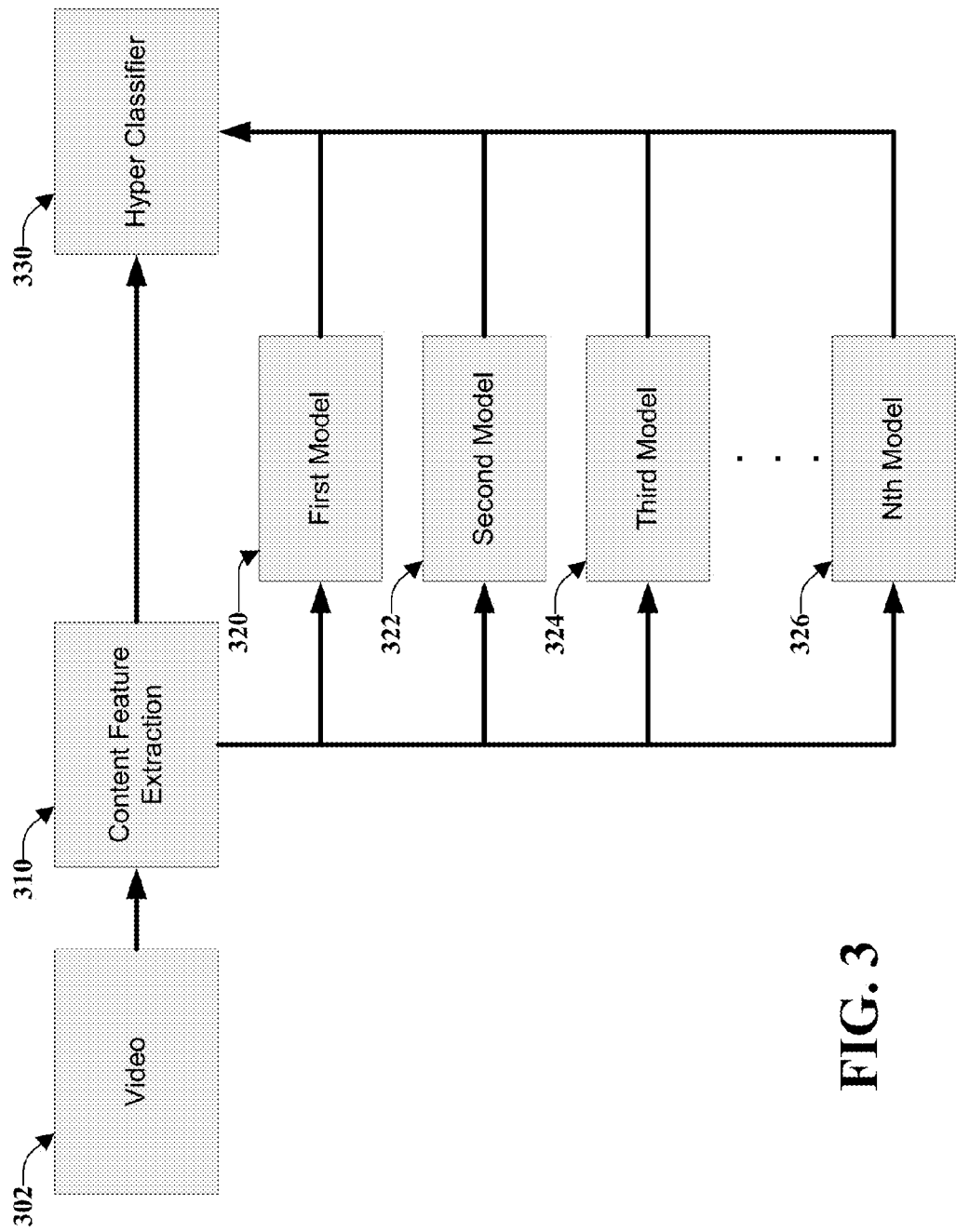
FIG. 3 illustrates a graphical block diagram of an example fusion scheme for classification knowledge transfer in accordance with implementations of this disclosure.

Turning now to FIG. 3, there is illustrated a high level graphical example of a fusion scheme used to improve classification performance in accordance with implementations of this disclosure. At 310, content features from a video 302 can be extracted. Example of features extracted include but are not limited to a histogram of local features, a color histogram, edge features, a histogram of textons, face features, color motion, shot boundary features, and audio features.

It can be appreciated that the histograms of local features can be the most efficient of the features identified, as they offer reasonable performance and a very compact storage size. To compute a histogram of local features, Laplacian-of-Gaussian (LoG) filters can be first used to detect interest points in each image frame (or with down-sampling). Similar to Sample Integrated Fourier Transform ("SIFT"), 118 dimensional Gabor wavelet texture features can be computed on the local region around each interest point. These local descriptors can then be quantized according to a codebook, e.g., built by hierarchical k-means. The size of the codebook, in one implementation, is twenty thousand. To obtain a global representation for each video, histograms of codewords can be accumulated across video frames.

Feature representations for a video can be represented across frames as a time series. A Haar wavelet transform (e.g., a 1D Haar transform) can then be applied to the time series at 8 scales, and moments (maximum, minimum, mean and variance) of the wavelet coefficients can be used as feature representation for the video.

Using these measured local features, a binary classifier can be trained for the plurality of event categories. For example, local histograms associated with a specific event category can be aggregated to identify common features. In one implementation, an adaptive boosting (AdaBoost) classifier can be trained using local features for each of the event categories. Decision stumps can be used as weak classifiers.

At 320, 322, 324 and 326, N models (where N is an integer) can be computed based on the extracted local features. In one implementation, N models can be used based on N category labels. For example, local histogram features of video 302 can be extracted at 310. The First Model 320 can utilize local histogram features of video 302 to calculate a classification score based on whether video 302 resides within the category label associated with first model 320. The Second Model 322 can calculate a classification score based on whether video 302 resides within the category label associated with second model 320. It can be appreciated that N different models can be applied to associate video 302 where each model is associated with a different category label.

Hyper classifier 330 can then use a late fusion strategy. Existing classification models (320, 322, 324, 326) are applied to the training data, and the output classifier scores are taken as semantic features. These semantic features are combined with the video content-based features to further train a hyper classifier, e.g., hyper classifier 330. AdaBoost can also be used for hyper classifier training. The hyper classifier can take advantage of prior information contained in the pre-trained event classifiers as well as the video content-based features. In one implementation, classification models (320, 322, 324, and 326) are only used that have greater than 70% accuracy to ensure the quality of knowledge contained within the models. Other thresholds of accuracy can also be used in other implementations.

It can be appreciated that by including classifier scores from 320, 322, 324, 326 along with local features of video 302, the performance of hyper classifier 330 can be improved over strictly including local features of video 302.

Various classification (explicitly and/or implicitly trained) schemes and/or systems (e.g., support vector machines, neural networks, expert systems, Bayesian belief networks, fuzzy logic, data fusion engines, AdaBoost classifiers . . . ) can be employed in connection with performing automatic and/or inferred action in connection with the claimed subject matter. To provide for or aid in the numerous inferences described herein, components described herein can examine the entirety or a subset of data available and can provide for reasoning about or infer states of a system, environment, and/or client from a set of observations as captured via events and/or data. Inference can be employed to identify a specific context or action, or can generate a probability distribution over states, for example. The inference can be probabilistic—that is, the computation of a probability distribution over states of interest based upon a consideration of data and events. Inference can also refer to techniques employed for composing higher-level events from a set of events and/or data. Such inference can result in the construction of new events or actions from a set of observed events and/or stored event data, whether or not the events are correlated in close temporal proximity, and whether the events and data come from one or several event and data sources.

A classifier can be a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., AdaBoost, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

It can be appreciated that at least two types of measurements can be used for quantitatively evaluating the classification performance. The first metric is Precision, Recall and F-score. Another metric is Equal Error Rate (EER), when the "accept" and "reject" errors are equal.

Figure 4:
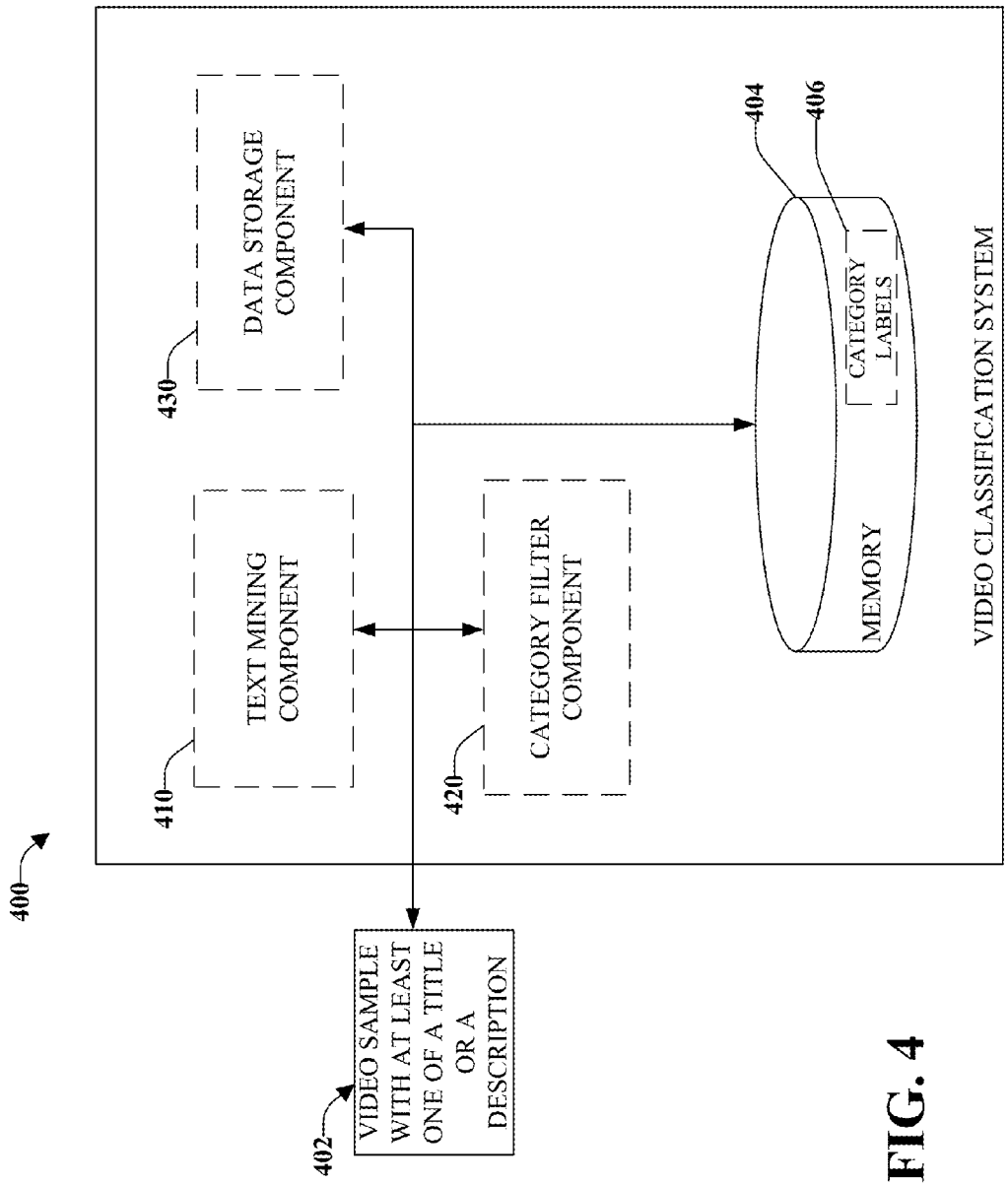
FIG. 4 illustrates a high-level functional block diagram of an example video classification system in accordance with implementations of this disclosure.

Turning now to FIG. 4 there is illustrated a high-level functional block diagram of an example video classification system in accordance with implementations of this disclosure. A text mining component 410 can text mine the at least one title or description of video sample 402 for at least one word combination wherein the word combination is at least one of a noun-verb combination or a verb-noun combination. It can be appreciated that the noun and the verb of the at least one noun-verb or verb-noun combination may be not adjacent to each other in the at least one description or title. A data storage component 430 can be configured to store in memory 404 the at least one word combination as a category label among a set of category labels 406. Category filter component 420 can filter the set of category labels 406 based upon lexical hierarchies, e.g., WordNet hierarchies. In one implementation, the hierarchy constrains the noun to be only within the hierarchy of physical entity and the verb to be within the hierarchies of act, move; act, human action, human activity; and happening, occurrence, natural event.

Figure 5:
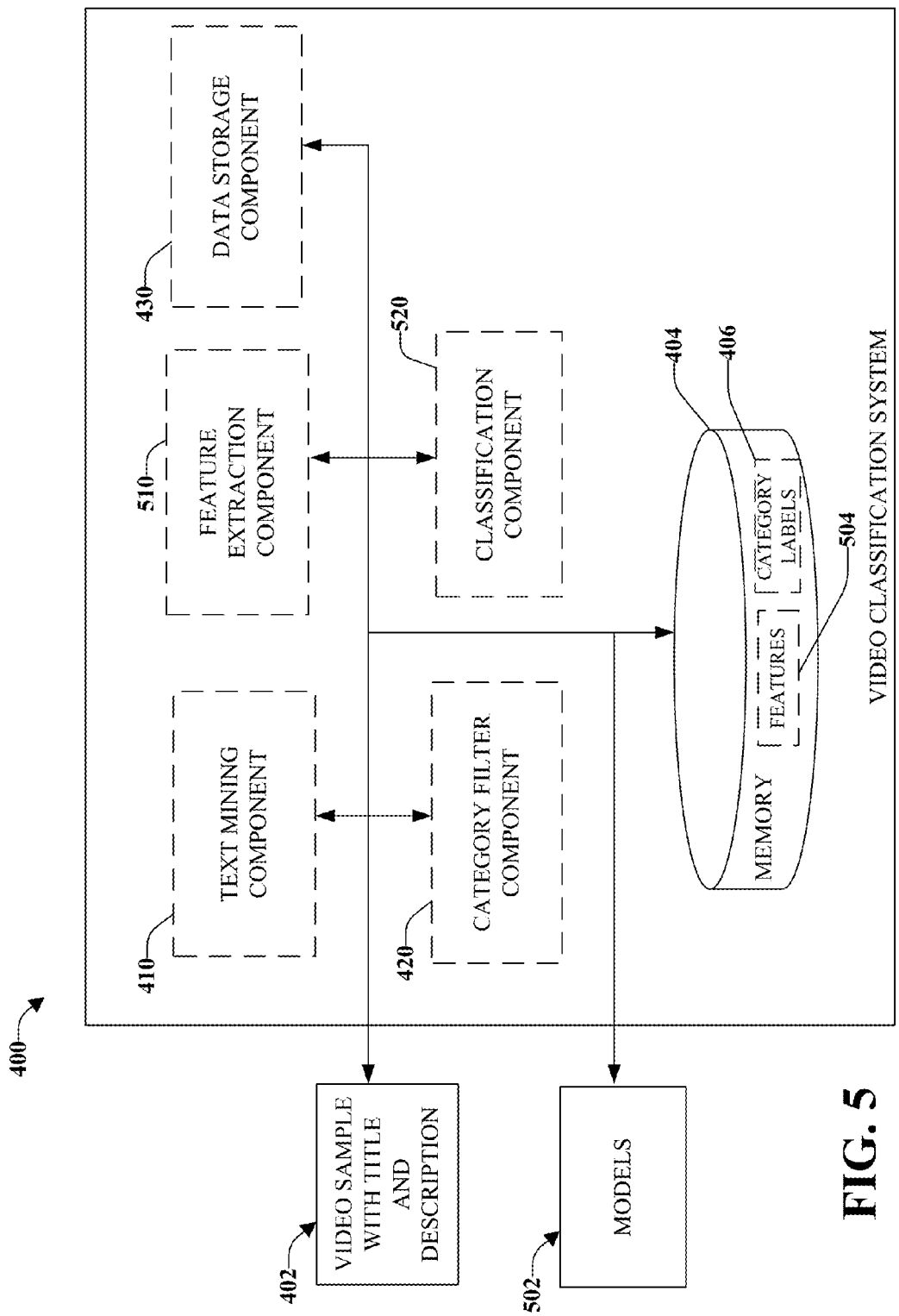
FIG. 5 illustrates a high-level functional block diagram of an example video classification system using a feature extraction component and a classification component in accordance with implementations of this disclosure.

Turning now to FIG. 5 there is illustrated a high-level functional block diagram of an example video classification system using a feature extraction component 510 and a classification component 520 in accordance with implementations of this disclosure. Feature extraction component 510 can extract a plurality of features from video sample 402. Data storage component can be further configured to store features 504 extracted by feature extraction component 510 in memory 404. In one implementation, the plurality of features include at least one of a histogram of local features, a color histogram, edge features, a histogram of textons, face features, color motion, shot boundary features, and audio features.

Classification component 520 can employ a plurality of models 502 based on the plurality of features to generate a plurality of classification scores and the classification component 520 can further associate the video sample with a category label based on the plurality of features and the plurality of classification scores. The models 502 can utilize a classifier including a binary classifier and/or an AdaBoost classifier. Each model can produce a classifier score that associates the video sample 402 with a category label. In one implementation, the numbers of models employed are identical to the number of category labels 406 stored in memory 404 wherein each model is associated with a separate category label. It can be appreciated that the classifier score associated with a model reflects the likelihood that video sample 402 resides in the category label associated with that model. Models can be generated using videos known to be a part of a category label to train the classifier to recognize common features.

In one implementation, classification component 520, using a hyper classifier, can associate video sample 402 with at least one category label 406 based on the classifier scores of the implemented models as well as the local features extracted by feature extraction component 510. It can be appreciated that by including classifier scores from the plurality of models along with the extracted local features of video sample 402, the performance of classification component 520 can be improved over strictly using extracted local features to classify video sample 402. In one implementation, the hyper classifier is an AdaBoost classifier.

Figure 6:
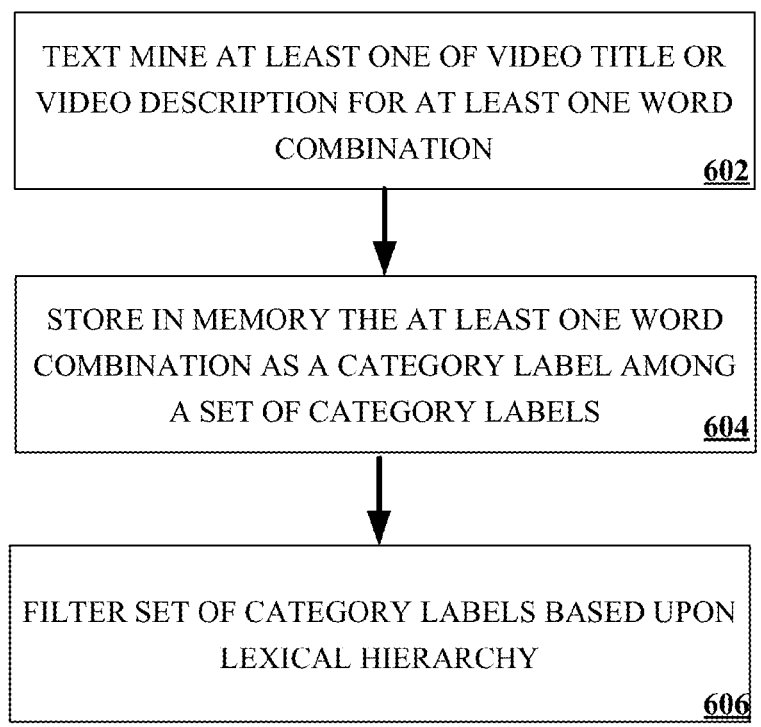
FIG. 6 illustrates an example methodology for text mining and category filtering in accordance with implementations of this disclosure.
Figure 7:
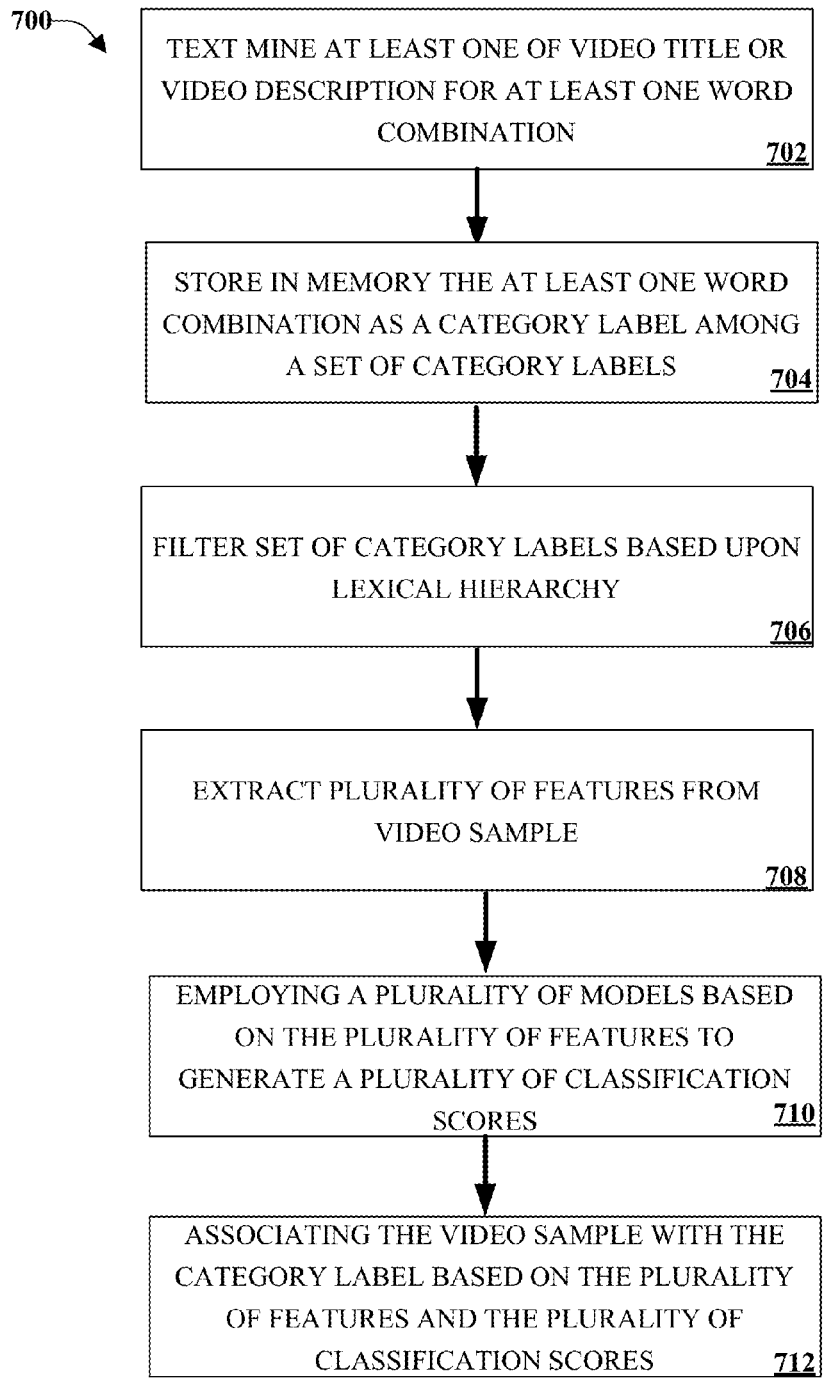
FIG. 7 illustrates an example methodology for text mining and category filtering using extracted content features to further classify the video in accordance with implementations of this disclosure.

FIGS. 6-7 illustrate methodologies and/or flow diagrams in accordance with this disclosure. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with the following methodologies.

FIG. 6 illustrates an example methodology for text mining and category filtering in accordance with implementations of this disclosure. At 602, at least one of a description or a title of a video sample is text mined (e.g., by a text mining component) for at least one word combination wherein the word combination is at least one of a noun-verb combination or a verb-noun combination. At 604, the at least one word combination is stored (e.g., by a data storage component) in a memory as a category label among a set of category labels. At 606, the set of category labels is filtered (e.g., by a category filter component) based upon noun-verb and/or verb-noun combination constraints. It can be appreciated that the constraints can be selecting at least one lexical hierarchy. For example, in one implementation, a lexical hierarchy within WordNet can be employed as the constraint.

FIG. 7 illustrates an example methodology for text mining and category filtering using extracted content features to further classify the video in accordance with implementations of this disclosure. At 702, at least one of a description or a title of a video sample is text mined (e.g., by a text mining component) for at least one word combination wherein the word combination is at least one of a noun-verb combination or a verb-noun combination. At 704, the at least one word combination is stored (e.g., by a data storage component) in a memory as a category label among a set of category labels. At 706, the set of category labels is filtered (e.g., by a category filter component) based upon noun-verb and/or verb-noun combination constraints. At 708, a plurality of features from the video sample is extracted (e.g., by a feature extraction component). The plurality of features can include at least one of a histogram of local features, a color histogram, edge features, a histogram of textons, face features, color motion, shot boundary features, and audio features.

At 710, a plurality of models based on the plurality of features is employed (e.g., by a classification component) to generate a plurality of classification scores. In one implementation, employing the plurality of models includes using a plurality of binary classifiers wherein each binary classifier is trained based upon an associated category label. It can be appreciated that in one implementation, the number of binary classifiers can equal the number of category labels. In one implementation, the binary classifiers can be AdaBoost classifiers. In one implementation, a model is only employed if an accuracy score of the model is greater than a predetermined threshold. In one implementation, the predetermined threshold is 70% accuracy.

At 712, the video sample is associated (e.g., by a classification component) with a category label based on the plurality of features and the plurality of classification scores. In one implementation, associating the video sample with the category label uses a hyper classifier that is automatically trained (included by not limited to automatically training itself) based on the plurality of features and the plurality of classification scores.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or fingerprints); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 8:
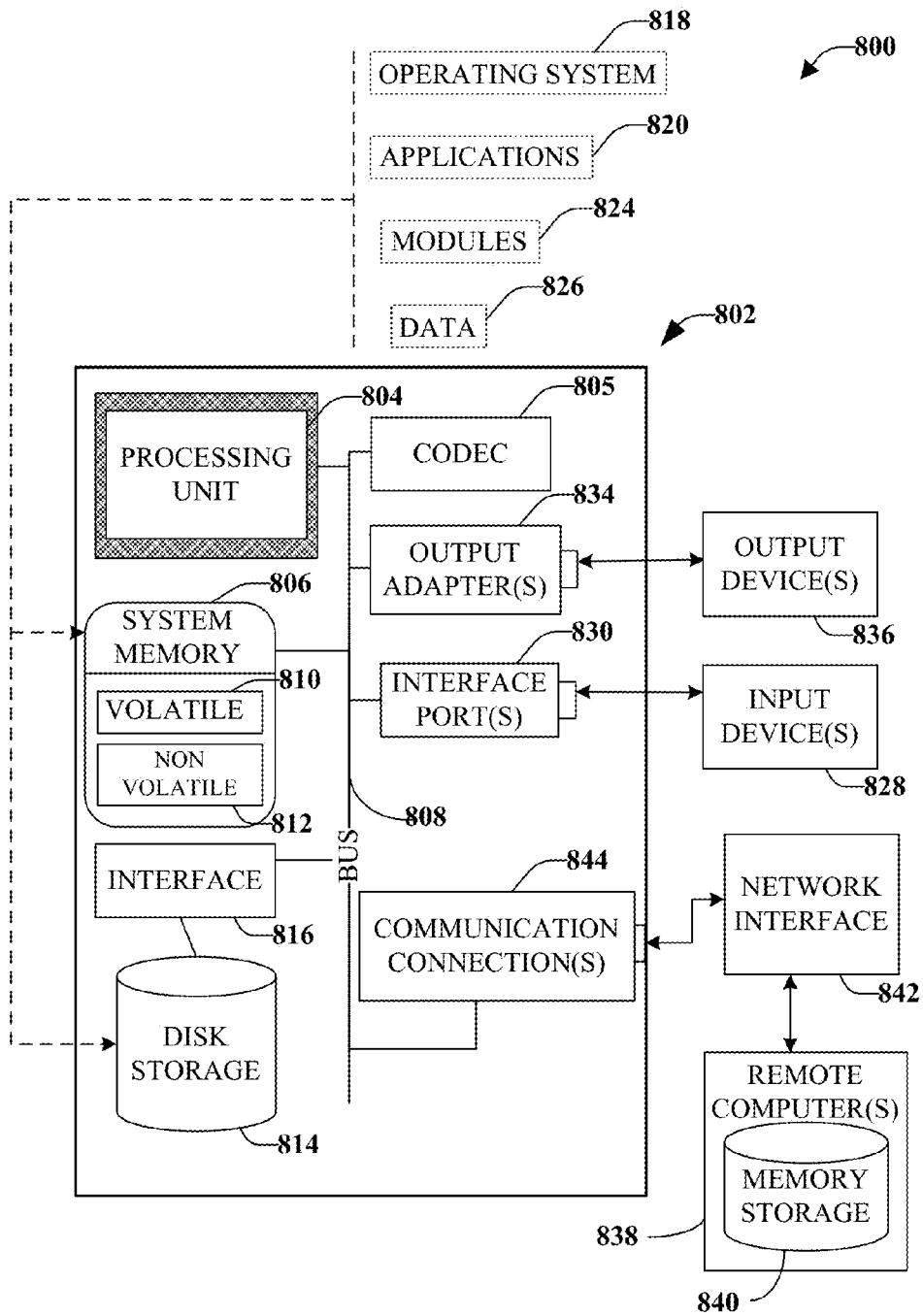
FIG. 8 illustrates an example schematic block diagram for a computing environment in accordance with the subject specification in accordance with implementations of this disclosure.

With reference to FIG. 8, a suitable environment 800 for implementing various aspects of the claimed subject matter includes a computer 802. The computer 802 includes a processing unit 804, a system memory 806, a codec 805, and a system bus 808. The system bus 808 couples system components including, but not limited to, the system memory 806 to the processing unit 804. The processing unit 804 can be any of various available processors. Dual microprocessors and other multiprocessor architectures also can be employed as the processing unit 804.

The system bus 808 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1384), and Small Computer Systems Interface (SCSI).

The system memory 806 includes volatile memory 810 and non-volatile memory 812. The basic input/output system (BIOS), containing the basic routines to transfer information between elements within the computer 802, such as during start-up, is stored in non-volatile memory 812. By way of illustration, and not limitation, non-volatile memory 812 can include read only memory (ROM), programmable ROM (PROM), electrically programmable ROM (EPROM), electrically erasable programmable ROM (EEPROM), or flash memory. Volatile memory 810 includes random access memory (RAM), which acts as external cache memory. According to present aspects, the volatile memory may store the write operation retry logic (not shown in FIG. 8) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 802 may also include removable/non-removable, volatile/non-volatile computer storage media. FIG. 8 illustrates, for example, a disk storage 814. Disk storage 814 includes, but is not limited to, devices like a magnetic disk drive, solid state disk (SSD) floppy disk drive, tape drive, Jaz drive, Zip drive, LS-100 drive, flash memory card, or memory stick. In addition, disk storage 814 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 814 to the system bus 808, a removable or non-removable interface is typically used, such as interface 816.

It is to be appreciated that FIG. 8 describes software that acts as an intermediary between users and the basic computer resources described in the suitable operating environment 800. Such software includes an operating system 818. Operating system 818, which can be stored on disk storage 814, acts to control and allocate resources of the computer system 802. Applications 820 take advantage of the management of resources by operating system 818 through program modules 824, and program data 826, such as the boot/shutdown transaction table and the like, stored either in system memory 806 or on disk storage 814. It is to be appreciated that the claimed subject matter can be implemented with various operating systems or combinations of operating systems.

A user enters commands or information into the computer 802 through input device(s) 828. Input devices 828 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 804 through the system bus 808 via interface port(s) 830. Interface port(s) 830 include, for example, a serial port, a parallel port, a game port, and a universal serial bus (USB). Output device(s) 836 use some of the same type of ports as input device(s) 828. Thus, for example, a USB port may be used to provide input to computer 802, and to output information from computer 802 to an output device 836. Output adapter 834 is provided to illustrate that there are some output devices 836 like monitors, speakers, and printers, among other output devices 836, which require special adapters. The output adapters 834 include, by way of illustration and not limitation, video and sound cards that provide a means of connection between the output device 836 and the system bus 808. It should be noted that other devices and/or systems of devices provide both input and output capabilities such as remote computer(s) 838.

Computer 802 can operate in a networked environment using logical connections to one or more remote computers, such as remote computer(s) 838. The remote computer(s) 838 can be a personal computer, a server, a router, a network PC, a workstation, a microprocessor based appliance, a peer device, a smart phone, a tablet, or other network node, and typically includes many of the elements described relative to computer 802. For purposes of brevity, only a memory storage device 840 is illustrated with remote computer(s) 838. Remote computer(s) 838 is logically connected to computer 802 through a network interface 842 and then connected via communication connection(s) 844. Network interface 842 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 844 refers to the hardware/software employed to connect the network interface 842 to the bus 808. While communication connection 844 is shown for illustrative clarity inside computer 802, it can also be external to computer 802. The hardware/software necessary for connection to the network interface 842 includes, for exemplary purposes only, internal and external technologies such as, modems including regular telephone grade modems, cable modems and DSL modems, ISDN adapters, and wired and wireless Ethernet cards, hubs, and routers.

Figure 9:
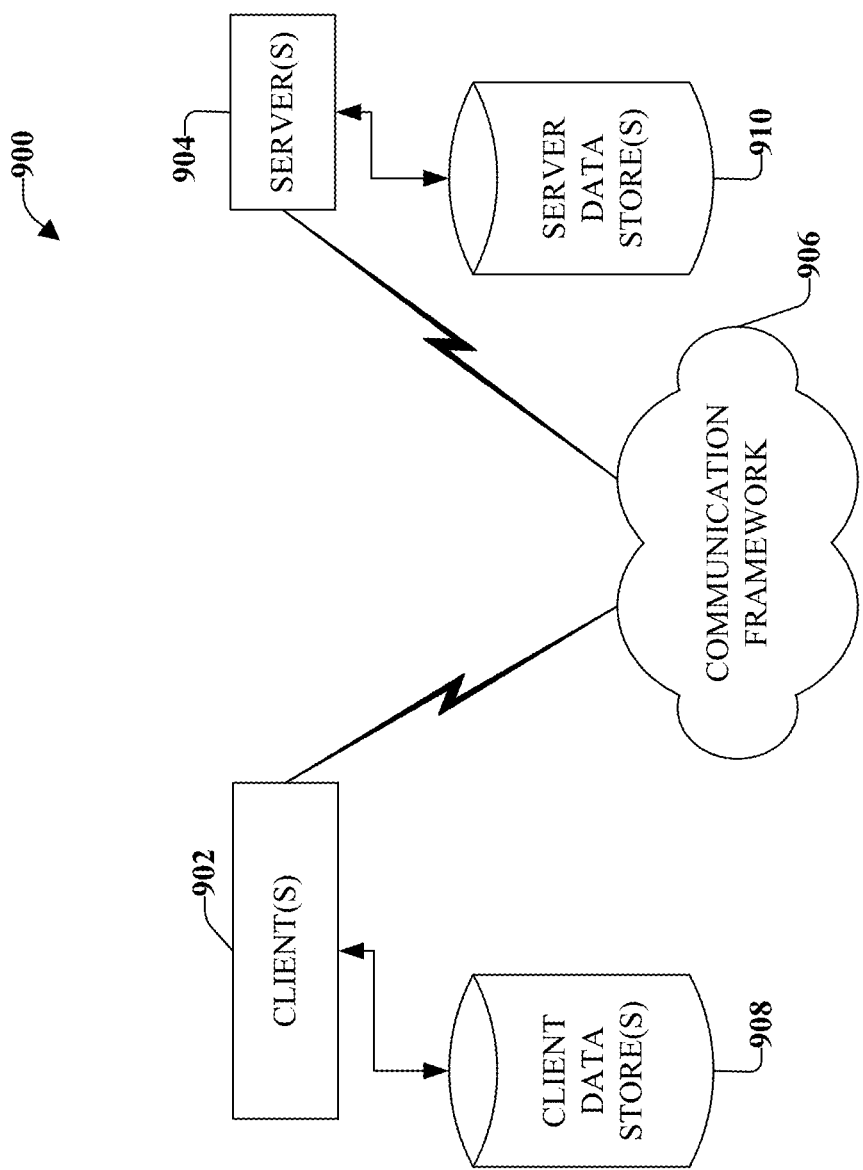
FIG. 9 illustrates an example block diagram of a computer operable to execute the disclosed architecture in accordance with implementations of this disclosure.

Referring now to FIG. 9, there is illustrated a schematic block diagram of a computing environment 900 in accordance with the subject specification. The system 900 includes one or more client(s) 902, which can include an application or a system that accesses a service on the server 904. The client(s) 902 can be hardware and/or software (e.g., threads, processes, computing devices). The client(s) 902 can house cookie(s), metadata, and/or associated contextual information by employing the specification, for example.

The system 900 also includes one or more server(s) 904. The server(s) 904 can also be hardware or hardware in combination with software (e.g., threads, processes, computing devices). The servers 904 can house threads to perform, for example, text mining, category label filtering, feature extraction, model employing, or associating a video sample with a category label. One possible communication between a client 902 and a server 904 can be in the form of a data packet adapted to be transmitted between two or more computer processes where the data packet contains, for example, an audio sample. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methodologies for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A video classification system comprising:
    a memory that stores computer executable components; and
    a processor that executes the following computer executable components within the memory:
        a text mining component that text mines metadata of a word combination that is at least one of a noun-verb combination or a verb-noun combination and that is associated with a video sample for the word combination, and wherein the metadata contains at least one of a description or a title of the video sample;
        a data storage component that stores in the memory the at least one of the noun-verb combination or the verb-noun combination as a video category label among a set of video category labels; and
        a category filter component that filters the set of video category labels containing the at least one of the noun-verb combination or the verb-noun combination stored in the memory based upon a lexical hierarchy.

2. The video classification system of claim 1, wherein a noun and a verb of the at least one noun-verb combination or verb-noun combination are non-adjacent to each other in the at least one description or title.

3. The video classification system of claim 1, wherein the lexical hierarchy constrains a noun of the at least one of the noun-verb combination or the verb-noun combination to be within a hierarchy of physical entity.

4. The video classification system of claim 1, wherein the lexical hierarchy constrains a verb of the at least one of the noun-verb combination or the verb-noun combination to be within hierarchies of act, move; act, human action, human activity; or happening, occurrence, natural event.

5. The video classification system of claim 1, further comprising:
    a feature extraction component that extracts a plurality of features from the video sample.

6. The video classification system of claim 5, wherein the plurality of features comprise at least one of a histogram of local features, a color histogram, edge features, a histogram of textons, face features, color motion, shot boundary features or audio features.

7. The video classification system of claim 5, further comprising:
    a classification component that:
        employs a plurality of models based on the plurality of features to generate a plurality of classification scores; and associates the video sample with the video category label based on the plurality of features and the plurality of classification scores.

8. The video classification system of claim 7, wherein the classification component associates the video sample with the video category label using a hyper classifier.

9. The video classification system of claim 7, wherein a model of the plurality of models is employed based on a determination that an accuracy score of the model is greater than a defined threshold.

10. A video classification method, comprising:
- text mining, by a device comprising a processor, metadata of a word combination that is at least one of a noun-verb combination or a verb-noun combination and that is associated with a video sample for the word combination, and wherein the metadata contains at least one of a description or a title of the video sample;
- storing in a memory of the device, the at least one of the noun-verb combination or the verb-noun combination as a video category label among a set of category labels; and
- filtering the set of video category labels containing the at least one of the noun-verb combination or the verb-noun combination stored in the memory based upon a lexical hierarchy.

11. The method of claim 10, wherein a noun and a verb of the at least one noun-verb combination or verb-noun combination are non-adjacent to each other in the at least one description or title.

12. The method of claim 10, wherein the lexical hierarchy constrains a noun of the at least one of the noun-verb combination or the verb-noun combination to be within a hierarchy of physical entity.

13. The method of claim 10, wherein the lexical hierarchy constrains a verb of the at least one of the noun-verb combination or the verb-noun combination to be within hierarchies of act, move; act, human action, human activity; or happening, occurrence, natural event.

14. The method of claim 10, further comprising:
- extracting a plurality of features from the video sample.

15. The method of claim 14, wherein the plurality of features comprise at least one of a histogram of local features, a color histogram, edge features, a histogram of textons, face features, color motion, shot boundary features or audio features.

16. The method of claim 14, further comprising:
- generating a plurality of classification scores based on the plurality of features determined employing a plurality of models; and
- associating the video sample with the video category label based on the plurality of features and the plurality of classification scores.

17. The method of claim 16, wherein the associating the video sample with the video category label comprises using a hyper classifier that is automatically trained based on the plurality of features and the plurality of classification scores.

18. The method of claim 16, wherein the employing the plurality of models comprises using a plurality of binary classifiers, wherein one or more of the plurality of binary classifiers is trained based upon an associated video category label.

19. The method of claim 18, wherein the binary classifier is a classifier.

20. The method of claim 18, wherein one or more of the plurality of models is employed based on an accuracy score of the one or more of the plurality of models being greater than a defined threshold.

\* \* \* \* \*